United States Patent [19]

Zumstein

[11] Patent Number: 4,859,828

[45] Date of Patent: Aug. 22, 1989

[54] PROCESS AND INSTALLATION FOR PRODUCING WORKPIECES

[75] Inventor: Ernst Zumstein, Kirchberg, Switzerland

[73] Assignee: Bystronic Laser AG, Industrestrasse, Niederonz, Switzerland

[21] Appl. No.: 144,226

[22] Filed: Jan. 15, 1988

[30] Foreign Application Priority Data

Jan. 16, 1987 [CH] Switzerland .................. 00139/87

[51] Int. Cl.$^4$ .............................................. B23K 26/00
[52] U.S. Cl. ........................... 219/121.67; 219/121.72; 219/121.82; 219/121.6; 219/121.85
[58] Field of Search ........... 219/121.6, 121.67, 121.72, 219/121.85, 121.82, 121.84

[56] References Cited

U.S. PATENT DOCUMENTS 4,201,905  5/1980  Clark et al. .............. 219/121 LG X

FOREIGN PATENT DOCUMENTS 2056897  3/1981  United Kingdom .

OTHER PUBLICATIONS

V.D.I.-Zeitschrift, vol. 125, No. 12, Jun. 1983, p. 494—"Laser-Schneid-Und Stanzzentrum".
Laser und Optoelectronik, vol. 17, No. 3, Sep. 1985—"Schneiden mit Laserstrahlung Laser Cutting". "Laser-Schneid-Und Stanzzentrum" and Laserschneiden, Stanzen, Nibbeln und Umformen, mit nur einer Maschine-Zeitschrift.

Primary Examiner—C. L. Albritton
Attorney, Agent, or Firm—Marks Murase & White

[57] ABSTRACT

To cut out workpieces from a sheet iron plate, the sheet iron plate is fed at first to a stamping and/or nibbling station in which stamping and nibbling operations ar executed. The sheet iron plate premachined in this way is then fed by means of transportation and buffer devices to a laser beam cutting machine in which longer, more complicated contours are cut out and the workpieces are cut out free from the sheet iron plate. During all cutting processes by means of the laser beam, the sheet iron plate remains stationary so that no problems arise with the handling of the cut free workpieces and the residual grid. Both existing machines can machine independently from each other for special works or can be utilized together for the successive machining of the same sheet iron plate, whereby buffers serve to store the sheet iron plates when e.g. the cycle time of the stamping and nibbling machine is higher than the cycle time of the laser beam cutting machine. This provide for an independent, optimal utilization of the capacities at disposal of the machines.

15 Claims, 5 Drawing Sheets

4,859,828

PROCESS AND INSTALLATION FOR PRODUCING WORKPIECES

BACKGROUND OF THE INVENTION

The present invention relates to a process and an installation for producing workpieces from a blank, more particularly a sheet iron plate, partly by stamping or nippling and partly by thermal cutting, more particularly laser beam cutting. Such processes and installations are known, whereby both stations are combined in one machine and operate on one and the same blank, e.g., a sheet iron plate. The considerable advantage of such combined installations is that small openings with simple contours can be rapidly and properly cut out by means of the tools in the stamping or nibbling station, while with the existing laser beam, longer and more compllicated contours can be cut using the laser instead of tools since tools would be too expensive or the stamping forces would not be sufficient. Such contours can also be worked by means of nibbling tools but this procedure is time consuming and it leads to unsatisfactory cutting surfaces. However, the known combined installations have various disadvantages. The programming cutting out of many parts from a sheet iron plate is expensive and it can not be done by a computer, or only at a high price. In the machine, the revolving tool holder and the laser cutting head are disposed at fixed places while the sheet iron plate which is held at the border by holding claws, is in motion during the machining. These holding claws impede a free partition of the surface at the disposal of the table for the parts to be produced. In case of great parts, the machine must be stopped and the part must be removed. Toward the end of the different cutting processes, there remains only a weak remnant in the form of a grid which jeopardizes the precise, correct movement during the remaining cutting operation and renders more difficult the removal of the residual grid. The principal disadvantage however is that only one machining station can be put in operation which prevents a rational production and an optimal use of the available cutting capacity.

SUMMARY OF THE INVENTION

It is an object of the present invention to eliminate the above mentioned disadvantages and to render possible a particularly rational production. To solve this problem, the process according to the present invention is characterized in that one produces in an independent stamping and/or nibbling station, whereby the blank is displaced during many cuts and in that independently of it, contours are cut at the blank lying in an unchanged position on a support in a cutting station by means of a thermal cutting member, more particularly a laser cutting head. The machining installation according to the present invention is characterized in that the two stations are capable of operating independently from each other such that separate blanks can be machined simultaneously in both stations, and in that there are provided in the stamping and/or nibbling station holding means for the blank. The holding means is mobile with respect to the tools during the machining. In the cutting station fixed holding or orientating means for the blank exist. During the machining mobile cutting means, more particularly a laser cutting head, exist in the means are provided for conveying the blanks between the stations. Due to the fact that both stations operate independently from each other in accordance with an individual program, they can work simultaneously so that they are optimally utilized. More particularly, it is possible at first to execute the stamping or nibbling works during which the sheet iron plate is not greatly weakened so that it can be displaced easily. Then, the cutting work at the sheet iron plate fixed in its support may take place so that the stability of the residual grid and the removal of pieces already cut do not present a problem. After completion of all machining works, the whole residual grid with the free, cut workpieces can be easily removed. Ideal programming is possible in each case, independently of the value of the number of pieces which have to be produced. Both stations can be used completely independently from each other in that workpieces can be produced by stamping or nibbling only, by laser cutting only or also by combined machining as described above. This permits utilization of free capacities which take place when the machining times or cycle times for determined workpieces are different in both stations. Then, the blanks are placed in buffers for intermediate storage in order for both stations to become independent of their cycle times.

The invention will be described further by way of examples of execution.

DETAILED DESCRIPTION OF THE INVENTION

Figure 1:
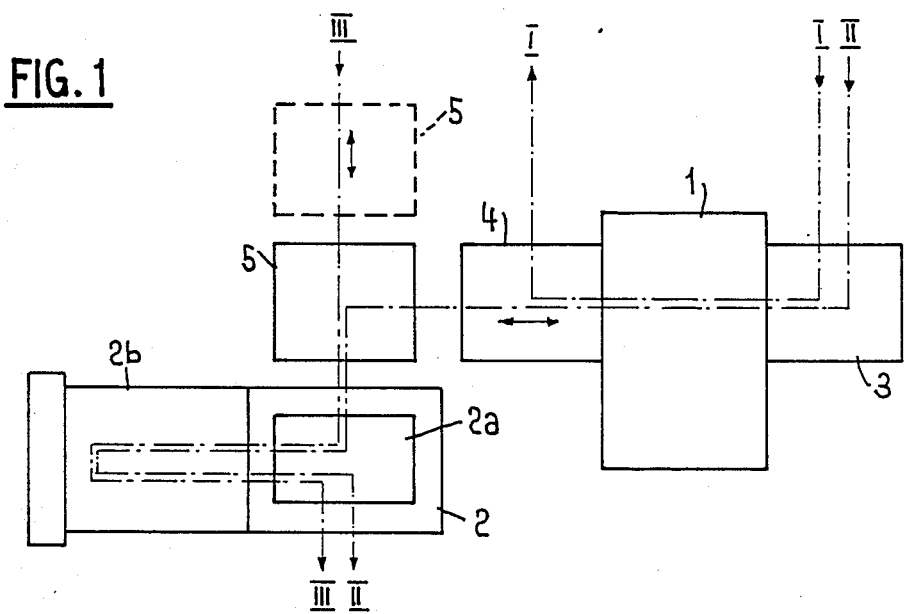
FIGS. 1 and 2 show schematically an example of execution of a machining installation according to the invention.

FIG. 1 shows schematically a machining installation with a stamping and nippling machine 1 and with a laser beam cutting machine 2. The stamping and nibbling machine 1 is provided with a revolving tool holder which is equipped with exchangeable tools, more particularly blanking punches and stamping tools which can be appropriately placed in a machining position and which can be used for stamping holes. The blank to be machined, more particularly a sheet iron plate, is held at one edge by means of holding claws and is brought in the programmed machining position for each individual machining operation. Typical stamping operations or nibbling operations can be executed with this machine in a rational, proper and precise manner.

The laser beam cutting machine 2 comprises a charging position 2a and a machining position 2b and it is provided with an automatic exchanging device which permits rapid removal of workpieces already machined and scrapings and introduction of a new blank to be machined, e.g. a sheet iron plate, in the machining position. In the machining position, the blank,, e.g. the sheet iron plate, remains stationary on the table of the machine while the laser beam is moved along the contour to be cut out through mobile mirrors in accordance with a program.

A charging position 3 through which sheet iron plates may be fed is associated with the stamping or nibbling machine 1. An acceptance and charging device 4 which is intended to accept machined sheet iron plates from the station 1 and to convey them to the station 2 is associated with both machines or stations. In FIG. 1 a double arrow shows that the acceptance and charging device 4 can execute a backward and forward motion so that it can take over a function of acceptance for the station 1 and a charging function for the station 2. It can also be displaced to the position of a second charging device 5 when the latter is displaced in an ineffective position as illustrated in the upper part of FIG. 1. This possibility of displacement of the charging device 5 is also indicated by a double arrow in FIG. 1. Both devices 4 and 5 can be foreseen as pure transportation devices or also as buffers or intermediate stores for many blanks.

Different possible sorts of machining which can be executed with this installation are illustrated by dot-and-dash lines I to III in FIG. 1. Line I indicates that determined workpieces on which only stamping and/or nibbling works are to be executed, are fed through the charging device 3 to the stamping and nibbling machine 1 where they are machined and then removed through the device 4. The line III indicates that blanks can be fed directly to the laser beam cutting machine 2, these blanks necessitating only a machining through laser beam cutting. The line II indicates that sheet iron plates are fed at first to the stamping and nibbling machine 1 where they are machined, then conveyed on the device 4 and through the same transferred and fed to the machine 2 for machining and removed after completion of the machining. Therefore, as already mentioned above, the existing capacity of the machine may be suitably used which means that workpieces may be machined one after the other in both stations 1 and 2 but it is also possible to machine partly or unmachined blanks only in one or the other station. If the devices 4 and 5 are in the form of buffers or intermediate stores, determined sheet iron plates can be stored in them for further machining. If the machining time of a determined blank in the station 1 is e.g. shorter than the machining time of the same blank in the station 2, the workpieces in the station 1 can be machined in a cycle duration which is optimal for this station and then they can be stored and machined afterwords in a slower cycle in station 2. If the machining of a determined series in station 1 is terminated, this station is available for the machining of other blanks which necessitate e.g. only one machining operation in the station 1. Correspondingly, free capacities of the station 2 can be utilized for determined machining operations when the station 1 is loaded differently or when it machines blanks which afterwards can be considerably more rapidly machined in the station 2. Accordingly, due to the full independence of both stations, optimal conditions exist for a rational utilization of the machine capacities available and the most rational production of workpieces.

Figure 2:
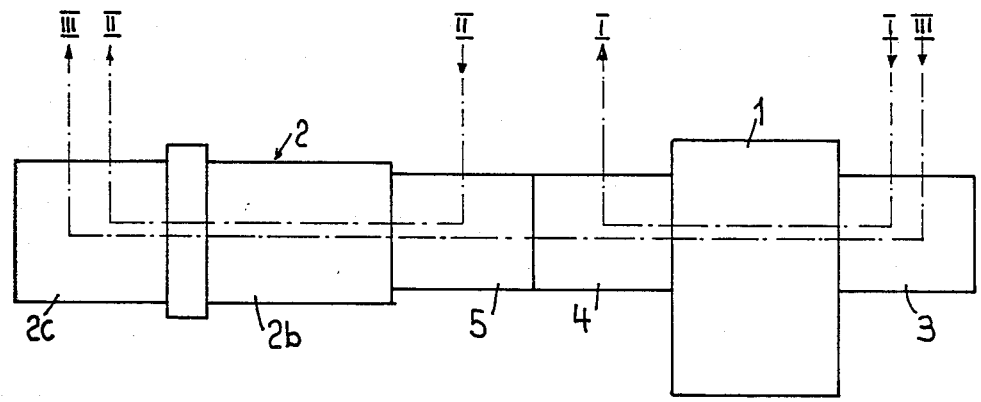

FIG. 2 shows a similar installation in which corresponding elements are designated by the same references as in FIG. 1. In this case, the devices 4 and 5 are not mobile but rather fixedly arranged and means are provided for the transfer of the blanks between these parts of the installation designed as buffers. The laser beam cutting machine 2 is slightly differently arranged in that the machining position 2b is disposed on the left hand side. The dot-and-dash lines I and III indicate again that sheet iron plates can be guided either through one or the other station 1 or 2 in order to execute special works or that sheet iron plates can be guided one after the other through the stamping and nibbling machine 1 through the buffers 4 and 5 and through the laser beam cutting machine 2 in order to execute any combination of machining operations. The remaining functions and possibilities correspond to those described above in connection with FIG. 1.

Figure 3:
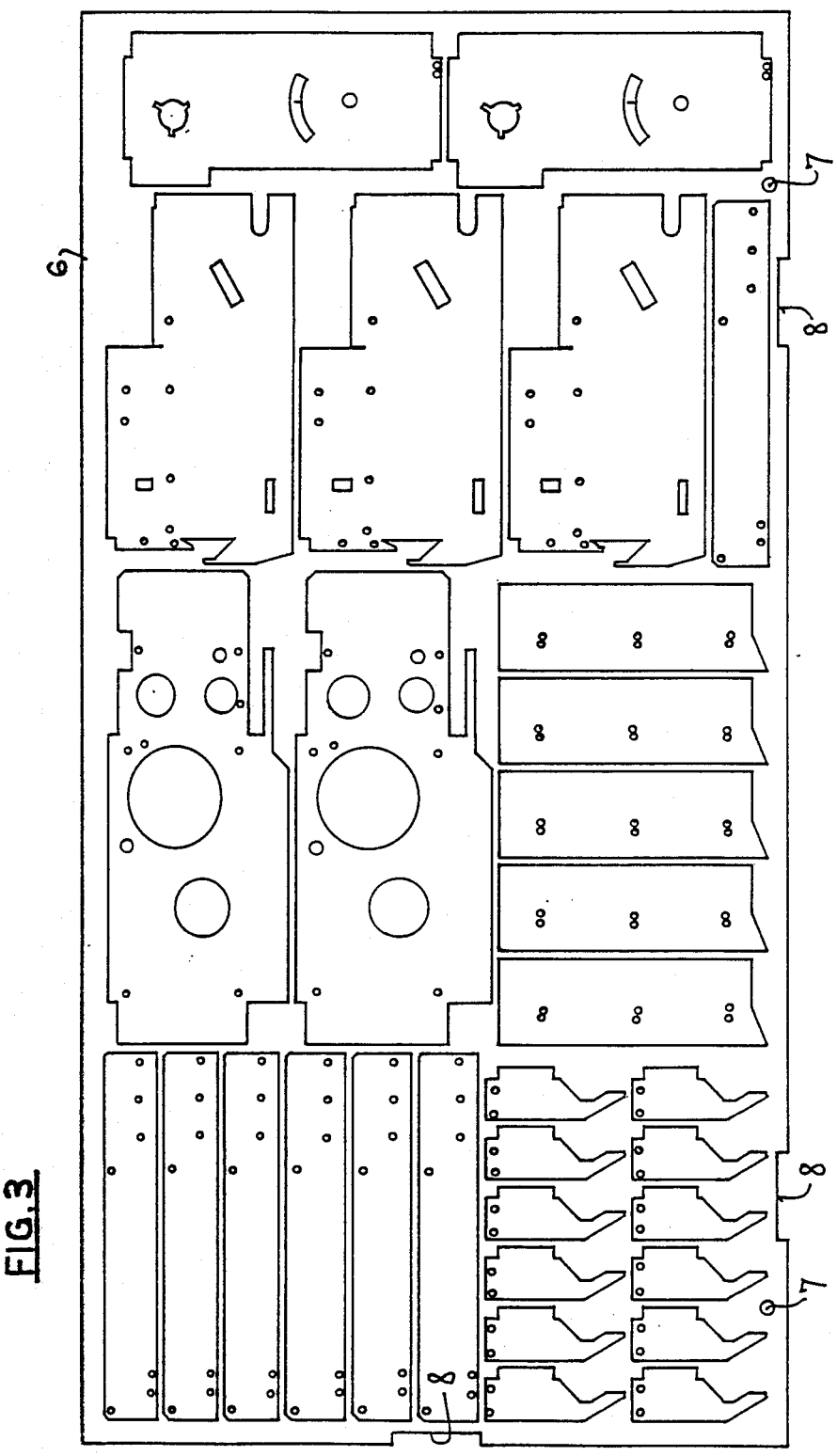
FIG. 3 shows an arrangement of terminated workpieces as they are cut out from a sheet iron plate.
Figure 4:
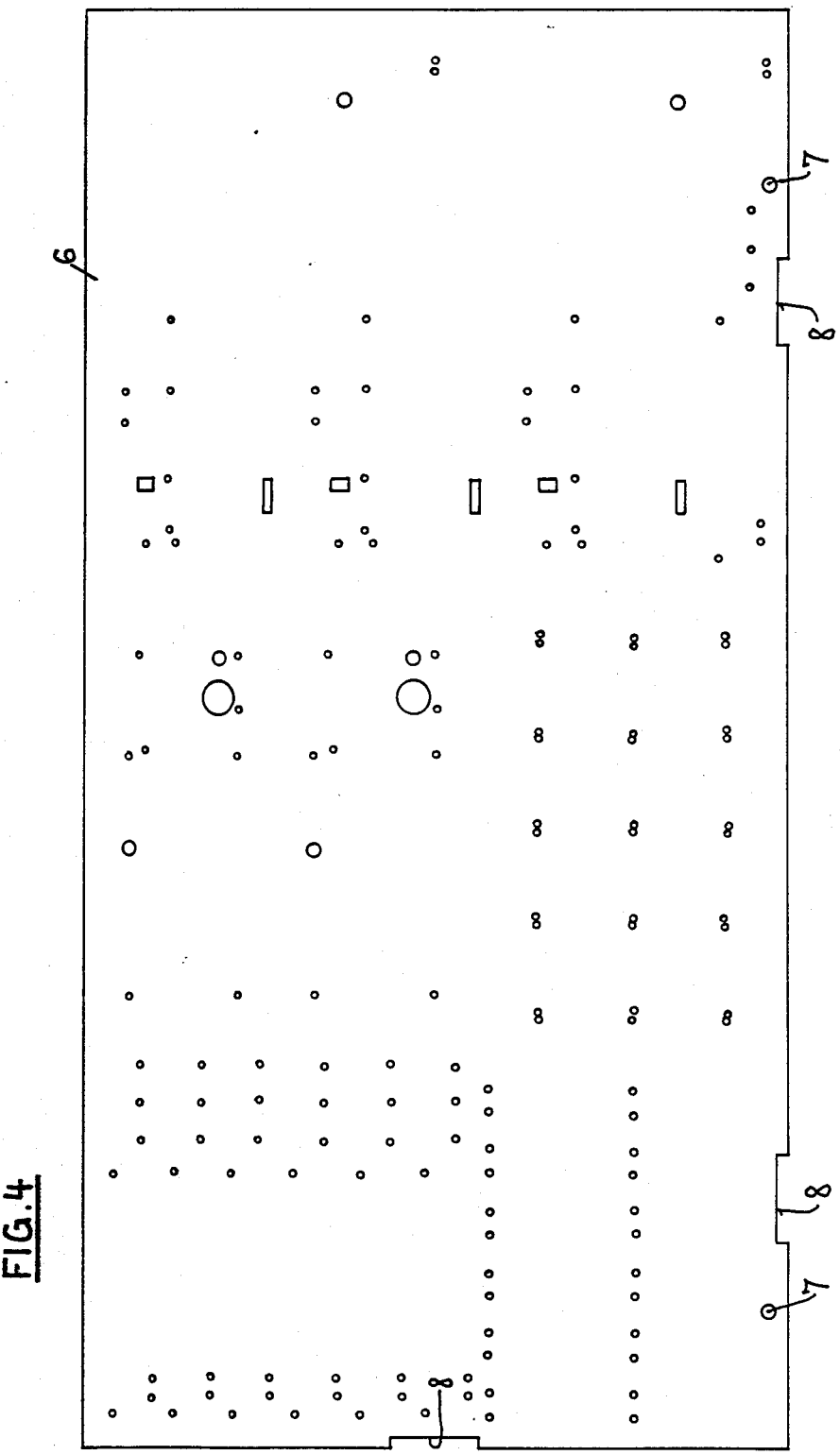
FIG. 4 shows the sheet iron plate after the first machining step in the stamping and nibbling station.
Figure 5:
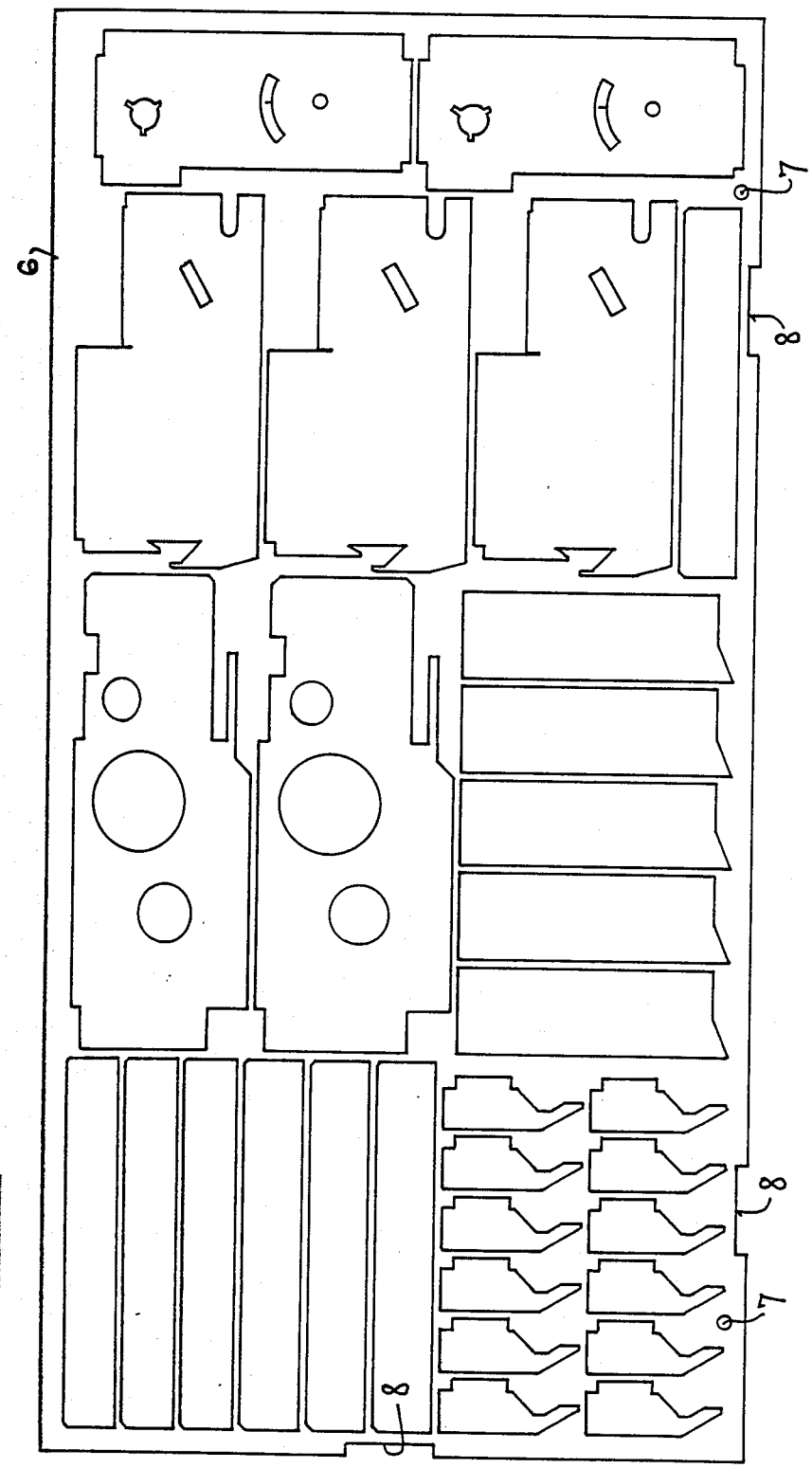
FIG. 5 shows the contours of the workpieces cut out by means of a laser beam.

FIGS. 3 to 5 show an example of machining. FIG. 3 shows a sheet iron plate 6 on which the illustrated individual workpieces with different holes must be machined. The unwrought sheet iron plate 6 is fed as described at first to the station 1, that is to the stamping and nibbling machine. FIG. 4 shows which machining operations are executed in this station, that is principally the stamping of small holes with simple, round or rectangular contours. For such machining operations normalized stamping tools as well as the necessary machining forces are available. At station 1, e.g. two holes of reference 7 are stamped at the lower edge of the sheet iron plate, these holes being provided at positions outside of the workpieces. Edge strips can also be stamped instead of reference holes in order to provide for precise edge stops 8. These orienting holes 7 or edge stops 8 serve to orient the sheet iron plate for the later machining operation in the station 2.

FIG. 5 shows the machining operations which have to be executed in the station 2. Here, principally the outer contours of the individual workpieces and also greater holes or holes with complicated forms are cut out by means of the laser beam. From the orienting holes 7 or the edge stops 8, the sheet iron plate in station 2 is oriented with precision by means of conical orienting or stops and it is held in unchanged orientation during the whole machining operations. The laser beam is displaced by means of mobile mirrors in order to cut out the contours illustrated in FIG. 5. Due to the fact that neither the sheet iron plate nor the individually stamped workpieces are displaced in station 2, no problem may arise even when the residual material strips between neighbouring cut out workpieces becomes very thin. The workpieces cut out and the residual grid can be removed from the laser beam cutting machine without any problems after completion of the machining.

Figure 6:
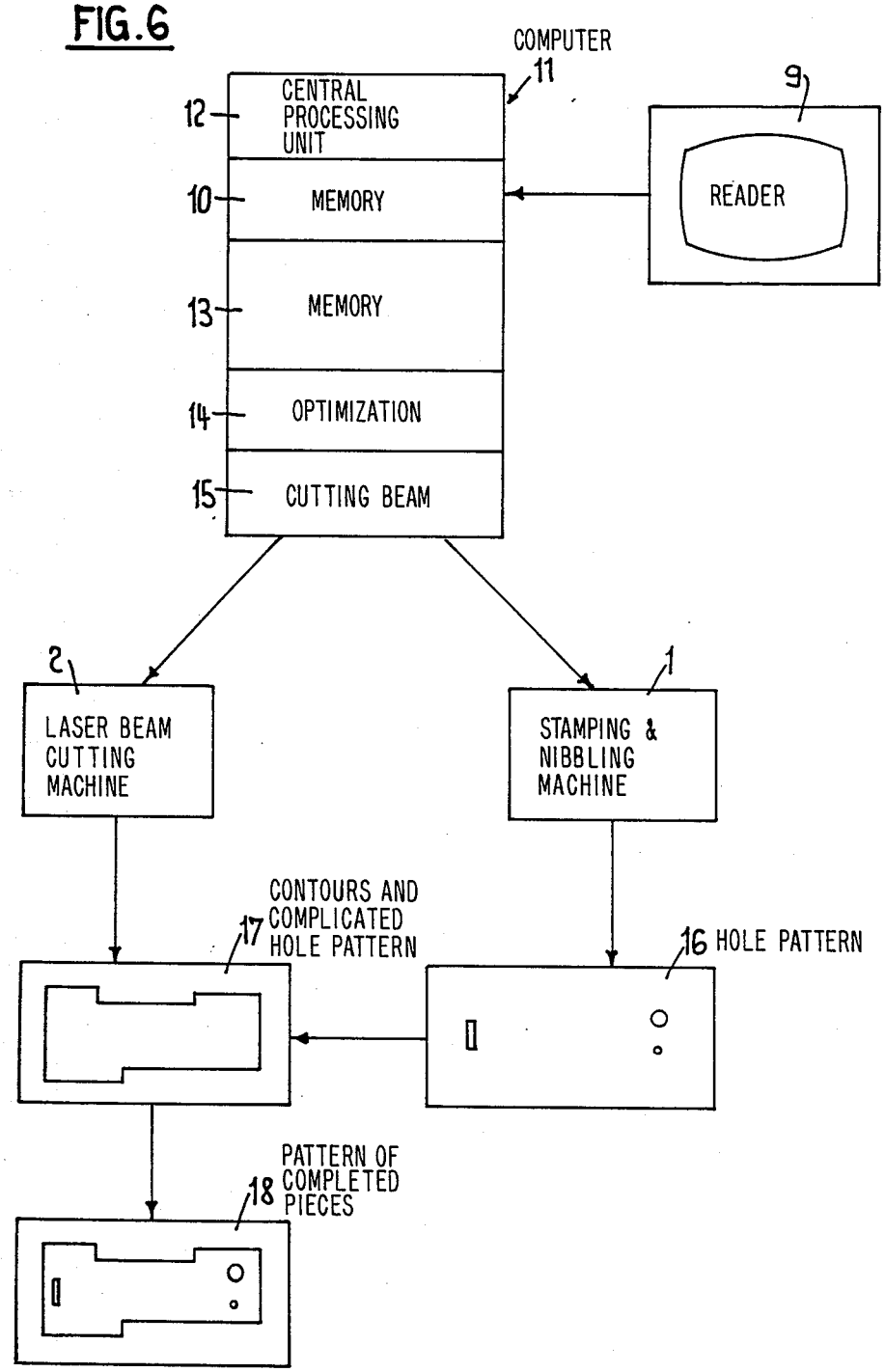
FIG. 6 shows schematically the processes, and the parts of the installation for preparing and executing a machining operation.

FIGS. 3 to 5 show the optimal disposition of the workpieces on the sheet iron and the optimal utilization of the sheet iron plate. This distribution and repartition takes place automatically by means of a computer in which are entered the geometrical data of the workpieces as well as an instruction list, that is the number of workpieces of each configuration to be produced. These procedures are schematically illustrated in FIG. 6. By means of a reader 9, the geometrical data of the individual workpieces is acquired and entered in the memory 10 of the computer 11 the central processing unit of which being designated by 12. The instruction list is entered in a further memory 13 of the computer, that is the number of pieces of the individual workpieces. As shown in FIG. 6, an optimization 14 of the disposition of the workpieces and of the machining operations takes place, then a cutting plan 15 is drawn up by means of which the stamping and nibbling machine 1 as well as the laser beam cutting machine 2 are controlled. The simple holes are then produced in the station 1 which is indicated at the position 16 and contours and holes of complicated forms are cut out in the station 2 as indicated at 17. From that result the terminated pieces as indicated by 18.

Different variants of execution are possible. While it has been assumed above that a machining installation comprises a stamping and nibbling press as well as a laser beam cutting machine, it would also be possible to integrate in the same installation two laser beam cutting machines when for a particular application, and for a determinate service it is to be assumed that more cutting works than stamping works are to be executed. The transportation of the material, and the storage of the material between the individual stations would require a corresponding organization. Instead of a laser beam cutting machine, a machine for another kind of thermal cutting or another machine could be provided.

It has been assumed up to now that the blank is stationary in the cutting station and that the cutting element is moved. Decisive, however, is that the blank in the cutting station is stationary with respect to its support. It would also be possible to keep the blank stationary in the cutting station on a positioning table which is controlled for cutting the contours while the cutting element, e.g. the laser cutting head is stationary.

I claim:

1. A process for producing workpieces from a blank in the form of a plate, partly by stamping and partly by thermal cutting using a laser beam, characterized in that said blank is machined in a self-contained stamping station, in that said blank is positioned in a desired, determined location for each individual stamping operation and in that contours are cut in said blank in a cutting station by means of the laser beam, said blank lying in an unchanged position on a support in said cutting station.

2. A process according to claim 1, characterized in that the contours are cut in the blank lying in an unchanged position by a moveable cutting member.

3. A process according to claim 1 or 2, characterized in that the blank is first machined in the stamping station and afterwards in the cutting station.

4. A process according to claim 1 or 2, characterized in that machining of the blank occurs in both stations independently of each other for a time in accordance with each machining operation, and in that partly machined blanks are put in intermediate storage in at least one buffer.

5. A process according to claim 4, characterized in that each station is utilized for machining blanks when such blanks are machined in the other station for a shorter period of time, if at all.

6. A process according to claim 1 or 2, characterized in that the blanks are provided with orienting elements, such as holes.

7. A process according to claim 1 or 2, characterized in that the blanks are provided with orienting elements, such as edges.

8. A process according to claim 1 or 2, characterized in that a computer arranges each piece of the blank and controls both stations.

9. A new process for producing workpieces from a blank in the form of a plate, partly by stamping and partly by thermal cutting using a laser beam, characterized in that said blank is machined in a self contained stamping station, whereby said blank is brought to a desired, determined position for each individual stamping operation, said blank being further machined in a laser beam cutting station fully independent from said stamping station, said blank lying in an unchanged position on a support in said laser beam cutting station, whereby said blanks are loaded on independent conveying means for conveyance between said stamping and cutting stations.

10. A process according to claim 9, characterized in that a buffer is arranged between said stamping station and said cutting station for receiving blanks from said conveying means such that both stations can be loaded independently of each other and can operate with independent cycle times.

11. A machining installation for producing workpieces from a blank in the form of a plate, comprising a stamping station having stamping tools and a station for thermal cutting using a laser beam, whereby both stations are capable of operating independently of each other such that separate blanks can be machined simultaneously in both stations, whereby holding means for the blank are provided such that in said stamping station, said holding means are mobile with respect to said tools during machining of the blanks, and said holding means are fixed in the cutting station, the cutting station having cutting means such as a laser cutting head, and whereby independent means are provided for conveying the blanks between the stations.

12. An installation according to claim 11, characterized in that both stations comprise independent charging means and in that at least one buffer is arranged between both stations for receiving blanks such that both stations can be charged independently from each other and can work with independent cycle times.

13. An installation according to claim 11 or 12, characterized in that at least one station comprises tools for providing orienting elements, such as holes in the blanks.

14. An installation according to claim 11 or 12, characterized in that at least one station comprises tools for providing orienting elements, such as stop surfaces in the blanks.

15. An installation according to claim 11, characterized in that a computer is used to machine the blanks, the computer having means for acquiring and memorizing geometrical data of the workpieces, means for entering and memorizing data relating to how many workpieces are to be produced, means for optimizing production of the workpieces and means for providing a cutting plan.

* * * * *